United States Patent
Wu et al.

(10) Patent No.: US 8,798,325 B2
(45) Date of Patent: Aug. 5, 2014

(54) EFFICIENT AND FAULT TOLERANT LICENSE PLATE MATCHING METHOD

(75) Inventors: Wencheng Wu, Webster, NY (US); Vladimir Kozitsky, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 146 days.

(21) Appl. No.: 13/401,142

(22) Filed: Feb. 21, 2012

(65) Prior Publication Data

US 2013/0216101 A1 Aug. 22, 2013

(51) Int. Cl.
*G06K 9/00* (2006.01)
(52) U.S. Cl.
USPC .......................................................... 382/105
(58) Field of Classification Search
None
See application file for complete search history.

(56) References Cited

U.S. PATENT DOCUMENTS

| | | | |
|---|---|---|---|
| 5,850,480 A * | 12/1998 | Scanlon | 382/229 |
| 2002/0080013 A1 | 6/2002 | Anderson, III et al. | |
| 2004/0037470 A1 * | 2/2004 | Simske | 382/229 |
| 2005/0084134 A1 | 4/2005 | Toda | |
| 2007/0058856 A1 | 3/2007 | Boregowda et al. | |
| 2008/0031522 A1 * | 2/2008 | Axemo et al. | 382/181 |
| 2008/0131001 A1 | 6/2008 | Hofman et al. | |
| 2008/0212837 A1 | 9/2008 | Matsumoto et al. | |
| 2009/0208059 A1 | 8/2009 | Geva et al. | |
| 2009/0262977 A1 * | 10/2009 | Huang et al. | 382/103 |
| 2011/0194733 A1 | 8/2011 | Wilson | |
| 2012/0274777 A1 * | 11/2012 | Saptharishi et al. | 348/159 |

* cited by examiner

*Primary Examiner* — Bhavesh Mehta
*Assistant Examiner* — Siamak Harandi
(74) *Attorney, Agent, or Firm* — Luis M. Ortiz; Kermit D. Lopez; Tuesday A. Kaasch

(57) ABSTRACT

A method and system for identifying a matching license plate. A pair of full or partial plate numbers to be matched can be received. The pair includes a target plate made up of a first set of characters and a suspect plate made up of a second set of characters. A set of number-order preserved sub-plates can be generated by adding and subtracting a single character from the second set of characters. Utilizing a site specific license plate matching table (P-table), a matching score between each of the sub-plates and the target plate may be calculated as part of a string correlation calculation. A maximum value for each of the sub-plate matching scores can then be calculated. The maximum value can be normalized to a 0~100 scale and used as a final matching score. When the final matching score exceeds a predetermined threshold, an alert may be issued.

20 Claims, 4 Drawing Sheets

EFFICIENT AND FAULT TOLERANT LICENSE PLATE MATCHING METHOD

TECHNICAL FIELD

The disclosed embodiments generally relate to automatic license plate recognition technology. The disclosed embodiments also generally relate to fault tolerant license plate matching.

BACKGROUND OF THE INVENTION

Automatic license plate recognition (ALPR) technology as a means for vehicle identification has broad applications such as tolling, parking management, traffic violation enforcement, etc. A specific application of interest involves identifying a target vehicle from a partially known license plate number. Such approaches, however, have problems. Existing ALPR technology, for example, is far from perfect. In some instances, U can be mistaken as V, Z can be mistaken as 2, ALPR may drop or merge characters due to non-ideal sensing, and/or character segmentation, etc.

Consequently, in law enforcement situations such as an Amber Alert, it makes sense to err on the conservative side and release an alert when there is still some uncertainty about the wanted plate number. There is a large degree of uncertainty regarding how conservative the license plate matching system can function. Fortunately, common ALPR mistakes are not completely random. There are some dependencies in the appearance of the plate numbers. There are also some dependencies between ALPR mistakes and the sensing/object conditions. Thus, there exists a need to exploit these dependencies and provide an efficient and effective license plate matching system for use in high priority situations such as Amber Alerts.

BRIEF SUMMARY

The following summary is provided to facilitate an understanding of some of the innovative features unique to the disclosed embodiment and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an improved method and system for license plate matching utilizing an ALPR system.

It is, therefore, another aspect of the disclosed embodiments to provide a method of generating a set of sub-plates for use in computing a matching score between a target plate and a candidate plate.

It is, therefore, another aspect of the disclosed embodiments to provide a method and system of generating a site-specific license plate matching table.

The aforementioned aspects and other objectives and advantages can now be achieved as described herein. A method and system for identifying a matching license plate is disclosed herein, initially, a step can be implemented for receiving a pair of full or partial plate numbers to be matched. The pair can include a target plate that includes a first set of characters and a candidate plate that includes a second set of characters. A set of number-order preserved sub-plates can be generated by adding and subtracting a single character from the second set of characters. Utilizing a site specific license plate matching table (P-table), a matching score between each of the sub-plates, and the target plate may be calculated as part of a string correlation calculation. A maximum value for each of the sub-plate matching scores can then be calculated. The maximum value can be normalized to a 0~400 scale and used as a final matching score. Where the final matching score exceeds a predetermined threshold, an alert may be issued.

A number of embodiments, preferred and alternative are disclosed herein. For example, in one embodiment, a method for identifying a matching license plate can be implemented. Such a method can include, for example, the steps of identifying a target plate comprising a first set of characters and a candidate plate comprising a second set of characters, generating a set of sub-plates by adding and subtracting at least one character from the second set of characters, computing a matching score between the candidate plate, each of the sub-plates and the target plate, and computing a maximum for each of the matching scores in order to thereafter normalize the maximum to obtain a final matching score for each of the matching scores.

In another embodiment, a step can be provided for issuing an alert if the final matching score exceeds the predetermined threshold. In still another embodiment, a step can be provided for calculating the matching score from a license-plate match table. In yet another embodiment, a number order can be preserved in each of the sub-plates. In another embodiment, a step can be implemented for computing the matching score utilizing a string convolution. In yet another embodiment, the license-plate match table can be specific to a site in which an imaging device associated with the Automatic License Plate Recognition System is located. In still another embodiment, the license-plate match table can be generated from heuristic rules regarding image similarity, site-specific mistakes in character recognition, and a plate simulation module.

In another embodiment, a non-transitory computer-readable medium having computer-executable instructions for performing particular steps or instructions can be implemented. Such steps or instructions can include, for example, identifying a target plate comprising a first set of characters and a candidate plate comprising a second set of characters; generating a set of sub-plates by adding and subtracting at least one character from the second set of characters; computing a matching score between the candidate plate, each of the sub-plates and the target plate; and computing a maximum for each of the matching scores in order to thereafter normalize the maximum to obtain a final matching score for each of the matching scores.

In yet another embodiment, such steps or instructions can further comprise issuing the alert if the final matching score exceeds a predetermined threshold. In still another embodiment, such steps or instructions can further comprise calculating the matching score from a license-plate match table. In another embodiment, a number order can be preserved in each of the sub-plates. In still another embodiment, such steps or instructions can include computing the matching score utilizing a string convolution. In yet another embodiment, the license-plate match table can be specific to a site in which an imaging device associated with the Automatic License Plate Recognition System is located. In another embodiment, the license-plate match table can be generated from heuristic rules regarding image similarity, site-specific mistakes in character recognition, and a plate simulation module.

In another embodiment, a system for identifying a matching license plate can be implemented. Such a system can include, for example, an image capture device, and a central processing unit operably connected to a database. Such a system can further include a non-transitory computer-usable medium embodying computer code. In such a system, the non-transitory computer-usable medium can be coupled to the data bus, and the computer program code can include instructions executable by the processor and configured to, for example, identify a target plate comprising a first set of characters and a candidate plate comprising a second set of characters, generate a set of sub-plates by adding and subtracting at least one character from the second set of characters, compute a matching score between the candidate plate, each of the sub-plates and the target plate, and compute a maximum for each of the matching scores in order to thereafter normalize the maximum to obtain a final matching score for each of the matching scores.

In another embodiment, such instructions can be further configured for issuing the alert if the final matching score exceeds the predetermined threshold. In yet another embodiment, such instructions can be further configured for calculating the matching score from a license-plate match table. In yet another embodiment, such instructions can be further configured for preserving a number order in each of the sub-plates. In still another embodiment, the license-plate match table can be specific to a site in which an imaging device associated with the Automatic License Plate Recognition System is located. In yet another embodiment, the license-plate match table can be generated from heuristic rules regarding image similarity, site-specific mistakes in character recognition, and a plate simulation module.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

FIG. 2 illustrates a block diagram of a data-processing system that embodiments may be adapted for use with;

DETAILED DESCRIPTION

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete and will fully convey the scope of the invention to those skilled in the art. Unnecessary detail of known functions and operations may be omitted from the current description so as not to obscure the present invention. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
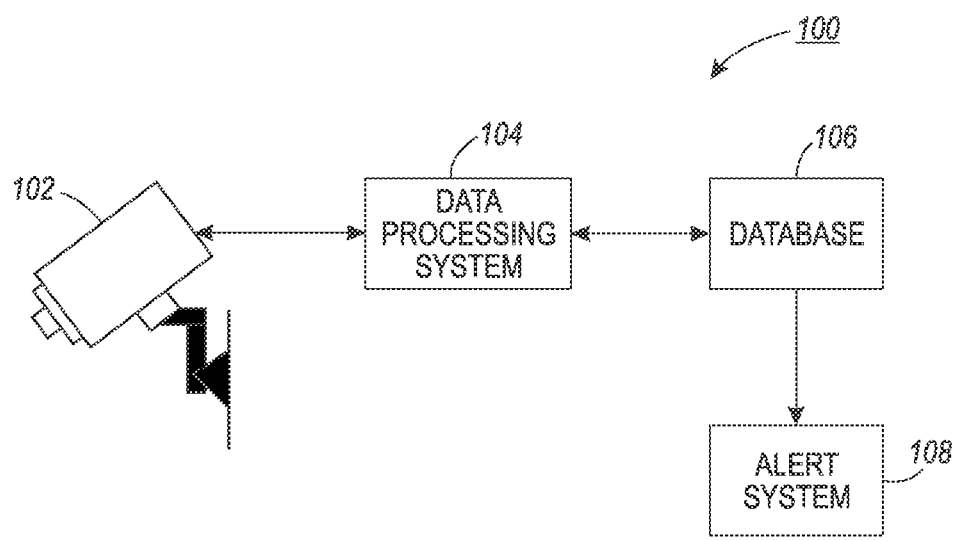
FIG. 1 illustrates an ALPR system.

A standard ALPR system 100, as illustrated in FIG. 1, consists of at least an image capturing device 102 being operably connected to a data processing system 104 capable of executing modules and being operably connected to a database 106. Communication between the components may be accomplished through directed data bus connections or by network connections. The ALPR system 100 functions by first capturing an image of a license plate utilizing the image capturing device 102. The image is then analyzed to detect, normalize, and enhance the image of the number plate. Optical character recognition (OCR) may then be employed to extract the alphanumerics of the license plate. ALPR systems 100 are typically deployed in one of two basic approaches: one allows for the entire process to be performed on-site in real-time, and the other transmits all the images to a remote location and performs the analysis off-site. The CPU 104 can also be connected to an alert system 108 that broadcasts a suspect plate to law enforcement or others.

Figure 2:
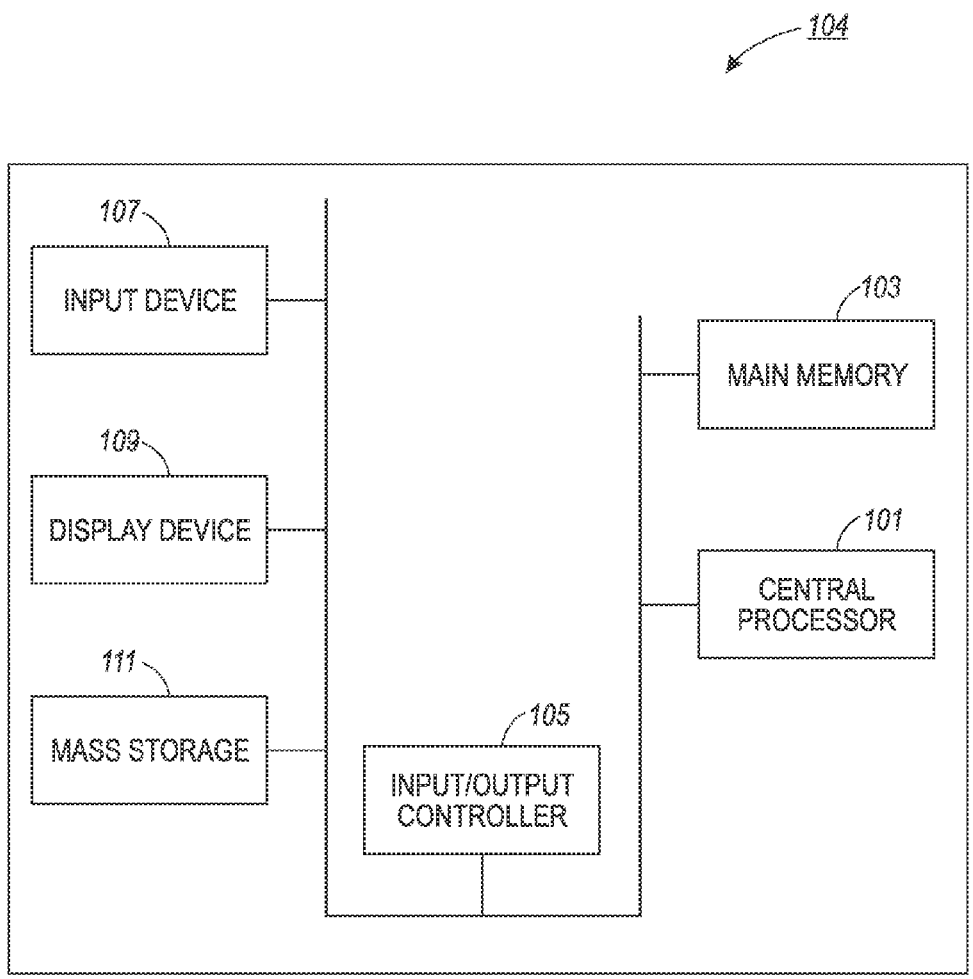

FIG. 2 illustrates a block diagram of a data-processing system 104 that embodiments may be adapted for use with. The system 104 comprises a central processor 101, a main memory 103, an input/output controller 105, an input device 107 (e.g. a mouse, track ball, keyboard, touch screen, etc.), a display device 109, and a mass storage 111. As illustrated, the various components of the data-processing system 104 communicate through a system bus or similar architecture. Embodiments of such a data-processing may include personal computers, laptops, netbooks, tablets, cellular phones or any device having data-processing and networking capabilities. It should be appreciated that FIG. 2 is only exemplary and is not intended to assert or imply any limitation with regard to the environments in which aspects or embodiments can be implemented. Many modifications to the depicted environments can be made without departing from the spirit and scope of the disclosed embodiments.

The embodiments described herein can be implemented in the context of a host operating system on the data processing system 104 and one or more modules. Such modules may constitute hardware modules such as, for example, electronic components of a computer system. Such modules may also constitute software modules. In the computer programming arts, a software "module" can be typically implemented as a collection of routines and data structures that performs particular tasks or implements a particular abstract data type.

Software modules generally include instruction media storable within a memory location of a data-processing system and are typically composed of two parts. First, a software module may list the constants, data types, variable, routines and the like that can be accessed by other modules or routines. Second, a software module can be configured as an implementation, which can be private (i.e., accessible perhaps only to the module), and that contains the source code that actually implements the routines or methods upon which the module is based. The term "module" as utilized herein can therefore generally refer to software modules or implementations thereof. Such modules can be utilized separately or together to form a program product that can be implemented through non-transitory signal-bearing media, including transmission media and/or recordable media.

Figure 3:
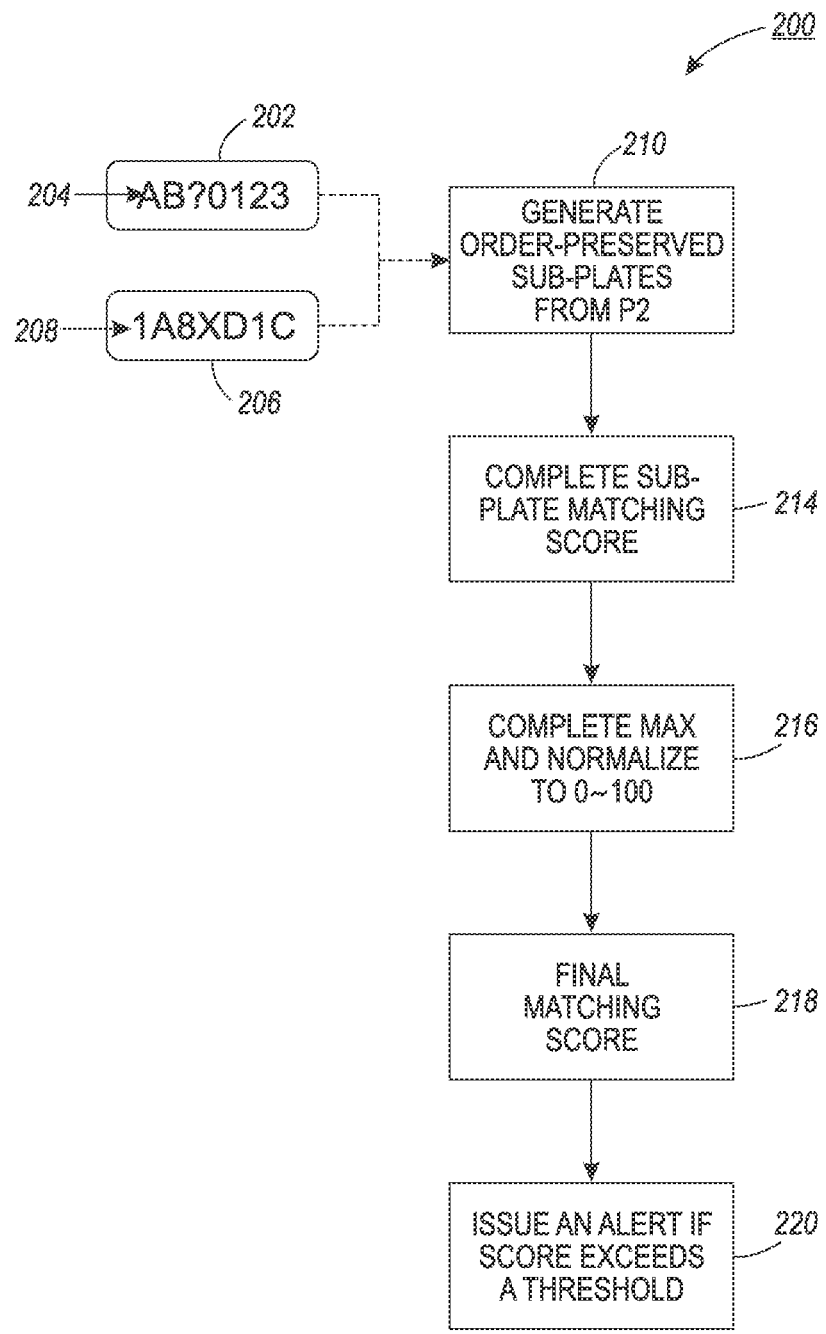
FIG. 3 illustrates a method for obtaining a matching score between a pair of license plates, which can be implemented in accordance with the disclosed embodiments.

As illustrated in FIG. 3, the disclosed method 200 of license plate matching functions by receiving a pair of full or partial plate numbers to be matched, a target plate 202 comprising a first set of characters 204 and a candidate plate 206 comprising a second set of characters 208. Additionally, a set of number-order preserved sub-plates 210 can be generated by adding and subtracting a single character from the second set of characters. For simplicity, we will refer the original candidate plate and the above mentioned sub-plates as a common term sub-plates from now on. Using a site specific license plate matching table (P-table), a matching score 214 between each of the sub-plates 210 and the target plate 202 may be calculated as part of a string correlation calculation. A maximum 216 value for each of the sub-plate matching scores 214 can then be calculated. The maximum value 216 can be normalized to a 0~100 scale and used as a final matching score 218. Where the final matching score 218 exceeds a predetermined threshold, an alert 220 may be issued.

Figure 4:
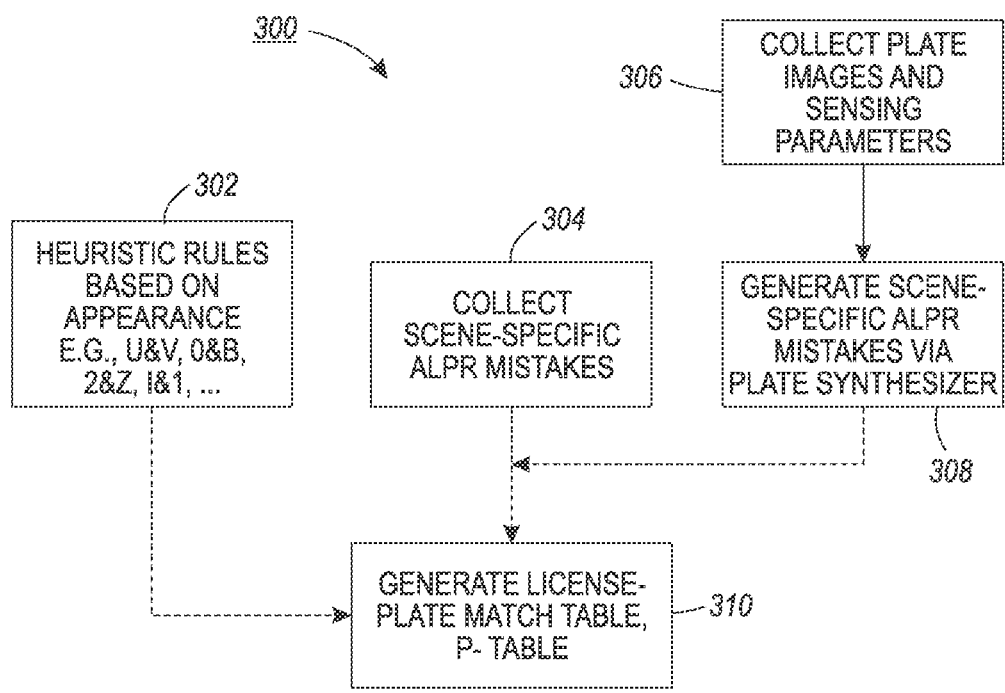
FIG. 4 illustrates a method for generating a site specific P-table, which can be implemented in accordance with the disclosed embodiments.

FIG. 4 illustrates a method 300 for generating the site specific P-table. The method 300 accounts for common sources of ALPR mistakes such as (1) image similarity (0 & O, 8 and B, 2 and Z, etc.) typically resulting from inadequate image resolution, (2) geometric distortion due to sensing, (3) non-uniform illumination, (4) motion and optical blur, (5) non-ideal character segmentation (may be caused by sources 2-4), and (6) sensor noise and weather artifacts, etc. Heuristic rules can generally aid in correction of mistakes caused by image similarity, but the other sources are difficult to account for in a typical ALPR system 100.

For each site of interest, heuristic rules may be determined and defined, as shown in block 302. In addition, ALPR mistakes may be collected from the real scene, as shown in block 304. Plate images and sensing parameters (such as camera height, camera calibration data, etc.) may then be collected at the site, as shown in block 306. These images and parameters may then be used as input to a plate simulator in order to generate a large set of synthetic plate images where the distorted images and known ground truths are used to train the ALPR's signature matching, as shown in block 308. The heuristic rules, ALPR mistakes, and synthetic plate images may then be used to generate the site specific P-table, as shown in block 310. The ALPR's signature matching will eventually reach a limit where it cannot always tell 8 from B under all conditions simulated and will have to use the lowest statistical probability of being wrong.

The method 300 for generating the site specific P-table described above is useful for new installations where human reviewed ground truth data is not available or insufficient to build a robust P-Table. For applications such as speed and red-light violation enforcement and most notably for roadway tolling, human reviewed ground truth data accumulates over time and with concurrent ALPR on captured images, the P-Table probabilities can be updated periodically, thus enabling the system to account for seasonal ambient illumination shifts as well as weather conditions.

Without loss of generality, the following examples focus on alphanumeric plate numbers without stack letters. It is understood that the same can apply to plates with stack letters.

Given a target wanted vehicle with known partial plate number (e.g. AB?0123, here ? means the character at 3rd "digit" is unknown) and a candidate plate number (e.g. 1A8XD1Z) from an ALPR to be matched, the matching algorithm will proceed as described below.

Given the candidate plate code 1A8XD1Z, generate all possible sub-plates where a character has been added and a character has been subtracted from the code. (i.e., character added—?1A8XD1Z, 1?A8XD1Z, 1A?8XD1Z, 1A8?XD1Z, 1A8X?D1Z, 1A8XD?1Z, 1A8XD1?Z, 1A8XD1Z?; character subtracted—A8XD1Z, 18XD1Z, 1AXD1Z, 1A8D1Z, 1A8X1Z, 1A8XDZ, 1A8XD1 . . . total of 15+1 original=16 possible sub-plates).

For each of the sub-plates above, a matching score can be calculated with the target plate (AB?0123) based on a string convolution where the sub-plate characters are shifted through the code and a matching score is computed for each shift. Note that in one embodiment we may choose to limit the shift to 0 (i.e. none), 1, or 2 position only based on our understanding of each ALPR system encountered. If the number of characters in the sub-plate equals N2 and the number of characters in the target plate equals N1, then N1+N2−1 matching scores are computed with the greatest score saved as the best matching score for that particular sub-plate. The formula to calculate the matching score for the 7th shift is:

$$S_7 = P(1,\sim) + P(A,A) + P(8,B) + P(X,?) + P(D,0) + P(1,1) + P(Z,2) + P(\sim,3).$$ i.

$$MS_i = \max(S_j)$$ ii.

wherein $MS_i$ is the matching score for $i^{th}$ sub-plate, P(x,y) is the character matching score between x & y. For purposes of this example, P(x, x)=1, P(x, y)=P(y, x), P(y, ?)=1. Thus, any character y is considered to match the unknown plate character. It should be noted that the unknown plate character is restricted and can only come from the target plate. Values for the remainder of entries for P(x, y) are mostly zero with a few non-zero entries and stored in a P-table. The final match score of the two plates is $\max((S)_i)$.

The selection and estimation of non-zero entries is a unique feature of the disclosed method. Exemplary non-zero entries in the P-Table are: P(8, B)=P(0, D)=P(2, Z)=P(5, S)=1 (or 0.8), which accounts for mistakes made by the ALPR system (or by human) between 8&B, 0&D, 2&Z, 5&S. Using such value assignment, it is apparent that 1A8XD1Z would be determined as a match with AB?012 based on the maximal match of sub-plate A8XD1Z to AB?012 (since 8&B, 0&D, Z&2 were considered as perfect matches with the above example P-Table).

The described order-preserved sub-plate matching allows character drops in ALPR output while performing the matching. Without this, a plate will be easily considered as mismatch if any of the first few characters is dropped.

In an alternate embodiment, it may be beneficial to extend the P-Table to cover interaction between neighboring characters (e.g., DL may be mistaken as N due to geometric distortion from sensing). For such extension, the P-Table can be expanded to treat neighboring characters as a single character. Similarly, stacked letters can be covered in the same fashion. In this extension scenario, a normalization step is needed. This can be accomplished in the creation of P-table or by employing a weighting process among various stages (1-character comparison, 2-character comparison, etc.). Note that even though this may increase the table size exponentially, it is still sparse in nature. There are many efficient methods for storage and operation of sparse matrices that can be used to manage this extension (e.g., using sparse matrix in MATLAB).

Based on the foregoing, it can be appreciated that a number of embodiments, preferred and alternative, are disclosed herein. For example, in one embodiment, a method for identifying a matching license plate, can be implemented. Such a method can include, for example, the steps of identifying a target plate comprising a first set of characters and a candidate plate comprising a second set of characters, generating a set of sub-plates by adding and subtracting at least one character from the second set of characters, computing a matching score between the candidate plate, each of the sub-plates and the target plate, and computing a maximum for each of the matching scores in order to thereafter normalize the maximum to obtain a final matching score for each of the matching scores.

In another embodiment, a step can be provided for issuing an alert if the final matching score exceeds the predetermined threshold. In still another embodiment, a step can be provided for calculating the matching score from a license-plate match table. In yet another embodiment, a number order can be preserved in each of the sub-plates. In another embodiment, a step can be implemented for computing the matching score utilizing a string convolution. In yet another embodiment, the license-plate match table can be specific to a site in which an imaging device associated with the Automatic License Plate Recognition System is located. In still another embodiment, the license-plate match table can be generated from heuristic rules regarding image similarity, site-specific mistakes in character recognition, and a plate simulation module.

In another embodiment, a non-transitory computer-readable medium having computer-executable instructions for performing particular steps or instructions, can be implemented. Such steps or instructions can include, for example, identifying a target plate comprising a first set of characters and a candidate plate comprising a second set of characters; generating a set of sub-plates by adding and subtracting at least one character from the second set of characters; computing a matching score between the suspect place, each of the sub-plates and the target plate; and computing a maximum for each of the matching scores in order to thereafter normalize the maximum to obtain a final matching score for each of the matching scores.

In yet another embodiment, such steps or instructions can further comprise issuing the alert if the final matching score exceeds a predetermined threshold. In still another embodiment, such steps or instructions can further comprise calculating the matching score from a license-plate match table. In another embodiment, a number order can be preserved in each of the sub-plates. In still another embodiment, such steps or instructions can include computing the matching score utilizing a string convolution. In yet another embodiment, the license-plate match table can be specific to a site in which an imaging device associated with the Automatic License Plate Recognition System is located. In another embodiment, the license-plate match table can be generated from heuristic rules regarding image similarity, site-specific mistakes in character recognition, and a plate simulation module.

In another embodiment, a system for identifying a matching license plate can be implemented. Such a system can include, for example, an image capture device, and a data processing system operably connected to a database. Such a system can further include a non-transitory computer-usable medium embodying computer code. In such a system, the non-transitory computer-usable medium can be coupled to the data bus 113, and the computer program code can include instructions executable by the processor and configured to, for example, identify a target plate comprising a first set of characters and a candidate plate comprising a second set of characters, generate a set of sub-plates by adding and subtracting at least one character from the second set of characters, compute a matching score between the candidate plate, each of the sub-plates and the target plate, and compute a maximum for each of the matching scores in order to thereafter normalize the maximum to obtain a final matching score for each of the matching scores.

In another embodiment, such instructions can be further configured for issuing the alert if the final matching score exceeds the predetermined threshold. In yet another embodiment, such instructions can be further configured for calculating the matching score from a license-plate match table. In yet another embodiment, such instructions can be further configured for preserving a number order in each of the sub-plates. In still another embodiment, the license-plate match table can be specific to a site in which an imaging device associated with the Automatic License Plate Recognition System is located. In yet another embodiment, the license-plate match table can be generated from heuristic rules regarding image similarity, site-specific mistakes in character recognition, and a plate simulation module.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A method for identifying a matching license plate, said method comprising:
    identifying a target plate comprising a first set of characters and a candidate plate comprising a second set of characters;
    generating a set of sub-plates by adding or subtracting at least one character from the second set of characters;
    computing a matching score between said candidate plate and said target plate;
    computing a matching score between each of said sub-plates and said target plate; and
    computing a maximum for each of said matching scores in order to thereafter normalize said maximum to obtain a final matching score for each of said matching scores.

2. The method of claim 1 further comprising issuing an alert if said final matching score exceeds a predetermined threshold.

3. The method of claim 1 further comprising calculating said matching score from a license-plate match table.

4. The method of claim 1 wherein a number order is preserved in each of said sub-plates.

5. The method of claim 1 further comprising computing said matching score utilizing a string convolution.

6. The method of claim 3 wherein said license-plate match table is specific to a site in which an image capture device is located.

7. The method of claim 6 wherein said license-plate match table is generated from heuristic rules regarding image similarity, site-specific mistakes in character recognition, and a plate simulation module.

8. A non-transitory computer-readable medium having computer-executable instructions for performing steps, said steps comprising:
    identifying a target plate comprising a first set of characters and a candidate plate comprising a second set of characters;
    generating a set of sub-plates by adding or subtracting at least one character from the second set of characters;
    computing a matching score between said candidate plate and said target plate;

computing a matching score between each of said sub-plates and said target plate; and computing a maximum for each of said matching scores in order to thereafter normalize said maximum to obtain a final matching score for each of said matching scores.

9. The non-transitory computer-readable medium of claim 8 wherein said steps further comprise issuing an alert if said final matching score exceeds a predetermined threshold.

10. The non-transitory computer-readable medium of claim 8 wherein said steps further comprise calculating said matching score from a license-plate match table.

11. The non-transitory computer-readable medium of claim 8 wherein a number order is preserved in each of said sub-plates.

12. The non-transitory computer-readable medium of claim 8 wherein said steps further comprise computing said matching score utilizing a string convolution.

13. The non-transitory computer-readable medium of claim 8 wherein said license-plate match table is specific to a site in which an image capture device is located.

14. The non-transitory computer-readable medium of claim 13 wherein said license-plate match table is generated from heuristic rules regarding at least one of image similarity, site-specific mistakes in character recognition, and a plate simulation module.

15. A system for identifying a matching license plate, said system comprising:
   an image capture device;
   a central processing unit operably connected to a database; and
   a non-transitory computer-usable medium embodying computer code, said non-transitory computer-usable medium being coupled to said data bus, said computer program code comprising instructions executable by said processor and configured for:
   identifying a target plate comprising a first set of characters and a candidate plate comprising a second set of characters;
   generating a set of sub-plates by adding or subtracting at least one character from the second set of characters;
   computing a matching score between said candidate plate and said target plate;
   computing a matching score between each of said sub-plates and said target plate; and
   computing a maximum for each of said matching scores in order to thereafter normalize said maximum to obtain a final matching score for each of said matching.

16. The system of claim 15 further comprising issuing an alert if said final matching score exceeds a predetermined threshold.

17. The system of claim 15 wherein said instructions are further configured for calculating said matching score from a license-plate match table.

18. The system of claim 15 wherein said instructions are further configured to preserve a number order in each of said sub-plates.

19. The system of claim 17 wherein said license-plate match table is specific to a site in which the image capture device is located.

20. The system of claim 19 wherein said license-plate match table is generated from heuristic rules regarding at least one of image similarity, site-specific mistakes in character recognition, and a plate simulation module.

* * * * *